3 Sheets—Sheet 1.
J. A. WHITNEY.
Machine for Making Pills.
No. 224,566. Patented Feb. 17, 1880.
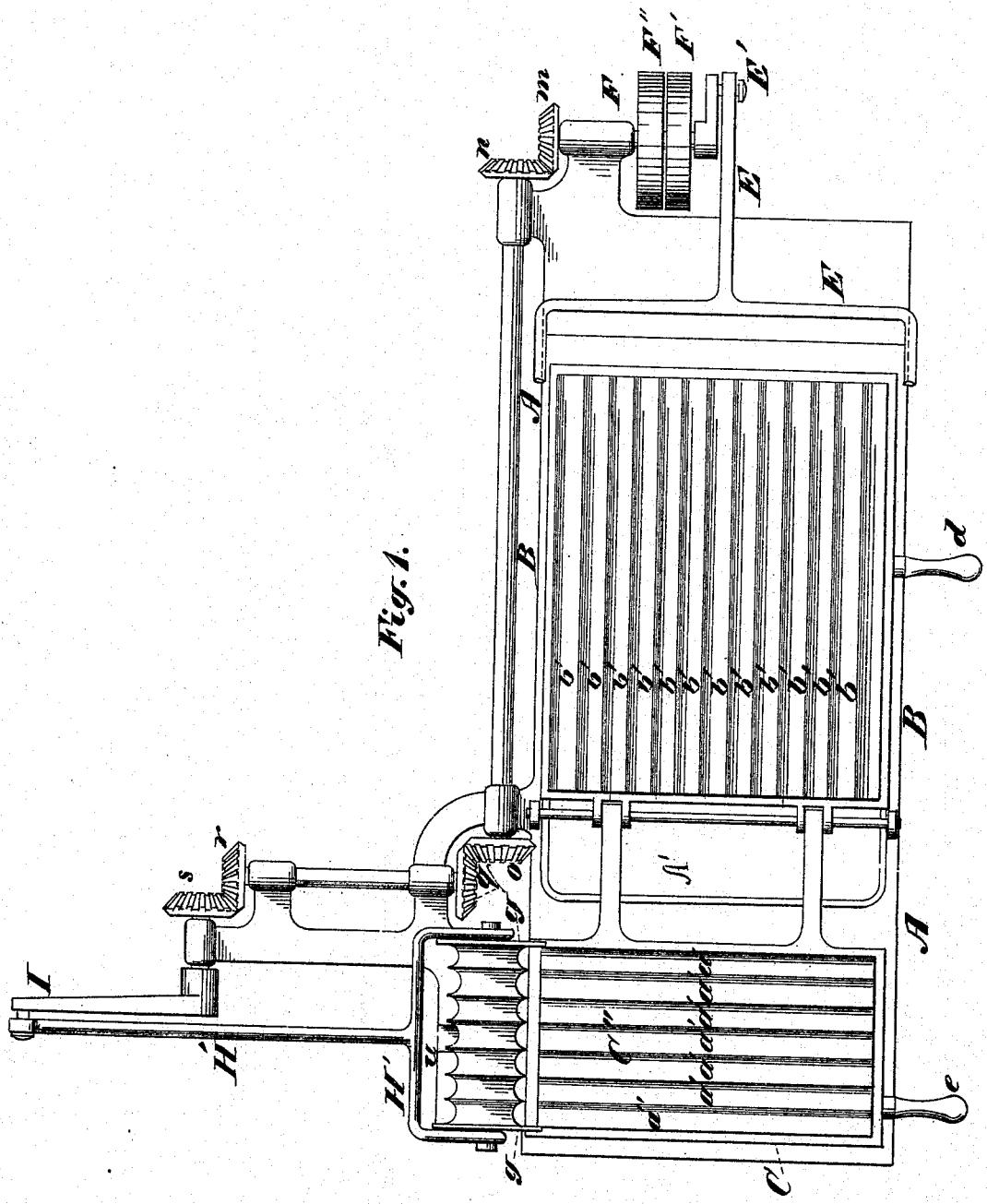
Witnesses
H. H. Parker
Chas. H. Dorat
Inventor
James A Whitney 3 Sheets—Sheet 2.
J. A. WHITNEY.
Machine for Making Pills.
No. 224,566. Patented Feb. 17, 1880.
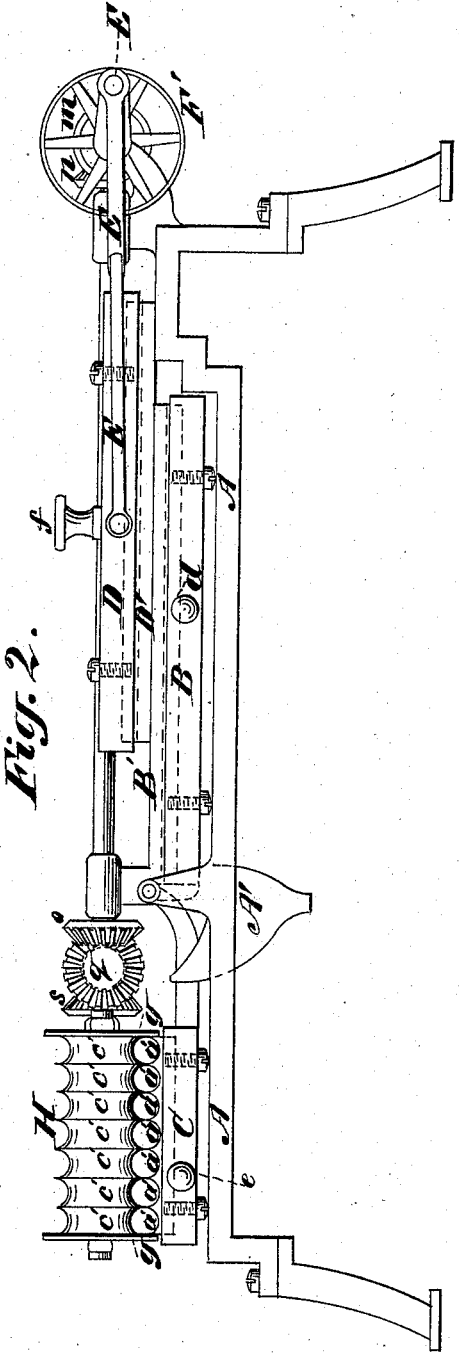
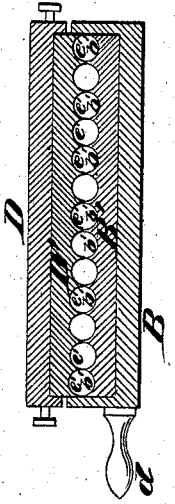
Witnesses.
Henry W. Parker.
Chas. H. Dorat.
Inventor.
James A. Whitney

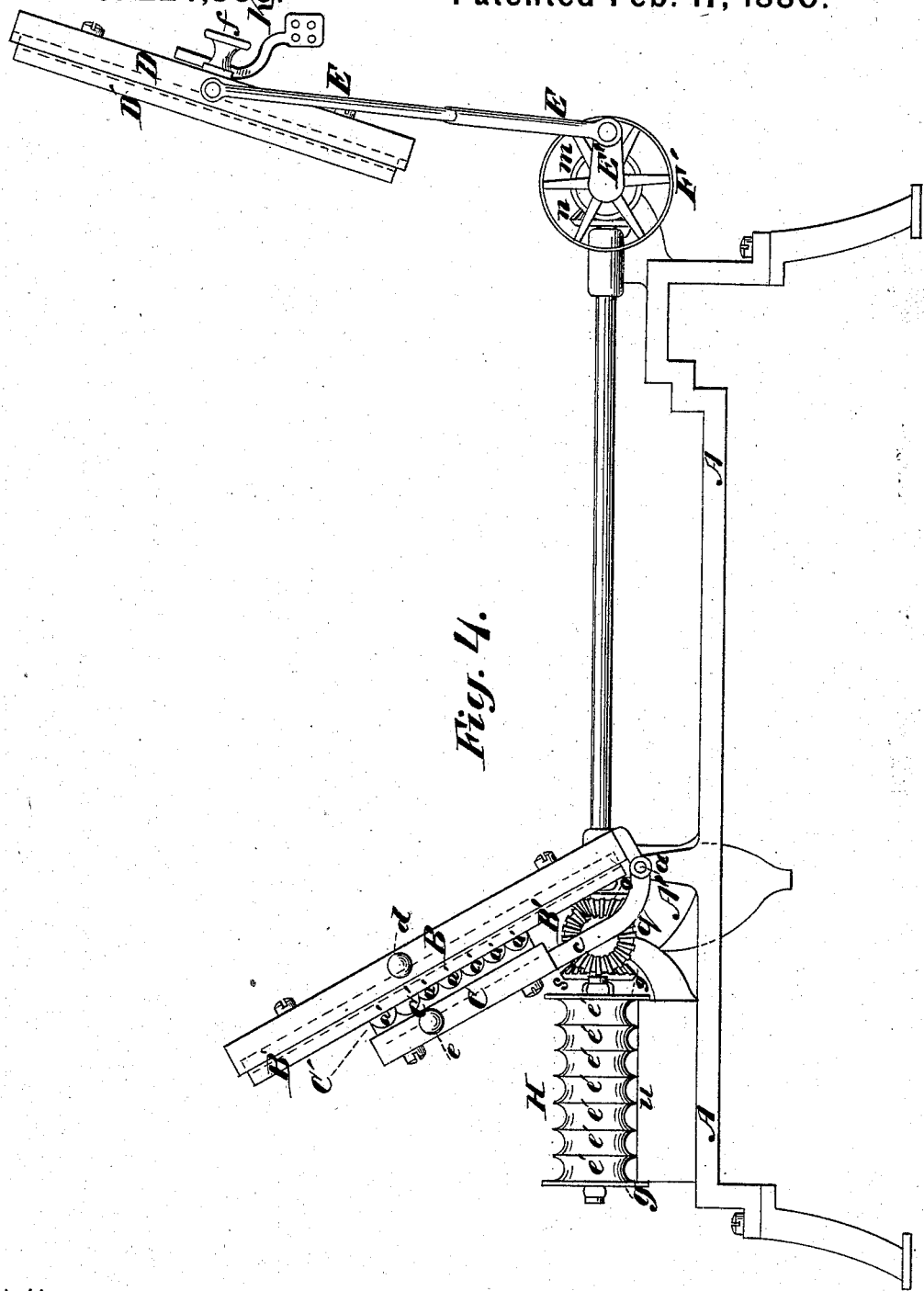

UNITED STATES PATENT OFFICE.

JAMES A. WHITNEY, OF NEW YORK, N. Y.

MACHINE FOR MAKING PILLS.

SPECIFICATION forming part of Letters Patent No. 224,566, dated February 17, 1880.

Application filed November 24, 1879.

*To all whom it may concern:*

Be it known that I, JAMES A. WHITNEY, of the city, county, and State of New York, have invented certain Improvements in Machines for Making Pills, &c., of which the following is a specification.

In the manufacture of pills in large quantities by machinery there is little difficulty so far as concerns those varieties in which nearly perfect uniformity of size and weight is not required; but so far as I am aware no machinery has hitherto been devised capable of operating with such accuracy as to produce with necessary uniformity those pills of finer character containing ingredients so powerful that comparatively slight variations in quantity materially modify their medicinal effect. For the reason just indicated pills of the character last mentioned are ordinarily manufactured by the old, slow, and comparatively expensive hand methods.

The object of my invention is to provide for the fabrication, by machinery, and in large quantities, of pills as perfect in uniformity of size and weight as the best of those hitherto made by hand. In order to accomplish this I embody in new combinations of working mechanism the grooved roller and grooved board or plate, which together form the usual, and, so to speak, primitive, device by which the ordinary hand method of shaping pills is practiced.

In the machine embracing my said invention two grooved plates, each hinged or pivoted at the edge adjacent to the other, (and each provided with its own appropriately-grooved cutting or shaping device,) are placed with the grooves of the one substantially at right angles to those of the other, in such manner that mass or pill material cut or molded into strips upon one of said plates may, by simply tilting the two plates upward toward and against each other, be transferred upon and across the grooves of the other, in order to be rolled or molded into pills thereon, the pills, when the shaping operation is completed, being thrown into a hopper or passage-way between the two grooved plates by simply lifting that one of said plates upon which the pills are completed. The grooved cutting or shaping devices are moved to and fro, each over its respective grooved plate, by suitable mechanical devices, and each is secured in a holder so constructed as to permit its removal and replacement by another in order that the apparatus may be used for the manufacture of different sizes of pills, the plates also being removable in like manner for like purpose.

The grooved cutting or shaping devices aforesaid are so fitted and arranged as to be readily brought off or away from the grooved plates, in order to permit the lifting or tilting of the latter, as required in the operation of the machine.

In the operation of the machine one quantity or portion of mass or pill material is shaped into strips while the strips from another quantity are being shaped into pills.

The apparatus as thus constructed embraces, as an invention, the several novel combinations of mechanical parts hereinafter described.

Figure 1 is a plan view and partial section of an apparatus embracing my said invention. Fig. 2 is a side view of the same, showing the parts in position for operation in cutting the mass into strips and the strips into pills. Fig. 3 is a cross-section of certain parts of said machine; and Fig. 4 is a side view of the machine, showing the position of the parts during the transfer of the strips from the grooved plate on which they are formed to the other grooved plate, on which they are formed into pills.

A is the bed-plate of the apparatus. In this bed-plate is formed a hopper, passage, or receptacle, as the case may be, (shown at A',) and the purpose of which will hereinafter appear.

B is a frame, in which is secured the longitudinally-grooved molding-plate B', and which is pivoted at its inner end to the bed-plate A, as shown at *a*, the pivoted end being over the hopper A'. At the opposite end of the bed-plate is a frame, C, in which is secured a grooved molding-plate, C', the grooves *a'* of which extend in a direction at right angles to the grooves *b'* in the other molding-plate, B'. The frame C has arms *c*, the ends of which are also pivoted at *a*. The length of the arms *c* is such that when the two plates B' C' are moved upward and inward the plate C' will be brought across the plate B′ at about the middle portion thereof. The length of the plate C′ should be equal to the width of the plate B′, and the width of said plate C′ should be proportioned to the number of strips of material to be shaped into pills on the plate B′, as hereinafter explained. Upon the lateral edge of the frame B is a handle, d, and upon the end of the frame C is a similar handle, e. These handles facilitate the raising and lowering of the plates B′ C′ in the working or operation of the apparatus.

D is a vibratory holder, in which is secured a third molding-plate, D′, identical with the plate B′, except that it is inverted in position. Upon the lateral edges of the frame B are upwardly-projecting flanges or guides, which retain and guide the molding-plate D′ in place with its grooves e′ exactly coincident with the grooves b′ of the plate B′, as represented in Fig. 3. A longitudinal reciprocatory movement is given to the frame D, and consequently to the plate D′, by means of a yoke and pitman, E, actuated by a crank, E′, on a shaft, F, to which rotary motion is given through a pulley, F′. Upon the top of the frame D is a knob or handle, f, by which the said frame D may be lifted when desired.

H is a roller having circumferential grooves c′, corresponding in their cross-section with the grooves a′ of the plate C, and coincident in position with said grooves a′, as shown in Fig. 2.

Upon the ends of the roller H are flanges g, which pass along the lateral edges a″ of the plate C′, and thereby retain the roller in posion as it is moved to and fro lengthwise of the plate C′. This movement of the roller is obtained by means of the yoke and pitman H′, which is actuated by a crank, I, which is rotated by a system of gears, m n o q r s, from the shaft F, as represented in Fig. 1. The crank I is arranged to bring the roller H entirely off from the plate C′ and upon a tablet or support, u, at one end of the throw of the crank, in order to permit the lifting of the said plate C′ when required.

The rotation of the shaft F gives motion simultaneously to the reciprocating molding-plate D′ and to the roller H. The motion of both may be in like manner simultaneously stopped by stopping the rotation of the shaft F—as, for example, by shifting the belt from the pulley F′ to a loose pulley, F″, by means of a suitable shifter. This shifter may be arranged to be operated by a treadle; but this, being a matter of mechanical judgment merely, needs no specific description here.

K is a stationary arm or bracket, which may be affixed to the wall or to any appropriate support in such relation to the machine that when the frame B is lifted and thrown back it will rest against said bracket, instead of being thrown entirely over backward, thereby facilitating its handling with use or operation of the machine.

In order to use the apparatus, the motion thereof is stopped at a point when the roller H is withdrawn at the rear end of the plate C′, and the frame B, with its plate B′, is then lifted upward and backward, as just explained, and as shown in Fig. 4. The plates B′ and C′, however, being in their horizontal position, as in Fig. 1, a flattened lump in suitable quantity of mass or pill material is laid upon the plate C′, extending across the same. Said material may be most conveniently used if formed in flat rectangular pieces of a length equal to the width of the plate C′. The subsequent movement of the roller H back and forth lengthwise on the plate C′ separates this lump into cylindric strips, one for each pair, so to speak, of coincident semicircular grooves c′ and a′. The two frames B C are then lifted upward and inward until the faces of the two plates B′ C′ meet, thus clamping the strips of mass deposited in the grooves a′ of the plate C′ across the face of the other plate, B′, whereupon both frames are turned over together until the frame B is brought back to its original horizontal position. This done, the plate C′ is turned back to its original horizontal position, leaving the strips therefrom deposited on the plate B′ and crosswise of the grooves b′ thereof. The reciprocating plate D′ is then brought down upon the plate B′, and the movement of the said plate D′ cuts the strips across, divides them into pieces, and rolls each piece between the surfaces of two coincident grooves, b′ e′, until it becomes circular in its cross-section and of a longitudinal contour corresponding to the cross-section of said coincident grooves. While this is going on another lump of mass is being operated upon in the same manner as hereinbefore explained by the roller H and plate C′, to provide strips for the next succeeding operation of the reciprocating plate D′ and the plate B′. When this batch of pills is thus shaped the reciprocating frame is lifted and thrown back, and the frames B and C are lifted upward and inward to deposit the succeeding batch of strips from the plate C′ upon the plate B′; but before this deposit of strips from the one plate to the other is accomplished the inclination given to the frame B causes the pills in the grooves b′ of the plate B′ to roll down the same into the hopper, passage, or receptacle at A′.

Although my said invention is more especially intended for the manufacture of pills, yet manifestly it may be applied to the production of other articles of spherical, spheroidal, oval, or other appropriate shape from any suitable plastic material, and, therefore, I do not limit myself to the use or employment of my said invention, or any part thereof, to the operations of pill-making alone.

What I claim as my invention, in a machine for making or shaping pills or other articles from suitable plastic material, is—

1. Two grooved plates hinged or pivoted at their adjacent edges, placed at right angles to each other, and each provided with a correspondingly-grooved cutting or shaping device, the whole combined substantially as and for the purpose set forth.

2. The tablet or support $u$, in combination with the roller H and plate C, substantially as and for the purpose set forth.

3. The combination of the sliding plate D′, the crank E′, pitman E, and plate B′, substantially as and for the purpose herein set forth.

4. The combination of the grooved plates C B, hinged or pivoted at their adjacent edges, and placed at right angles to each other, the grooved roller H, the grooved sliding plate D′, and mechanism for giving simultaneous operation to the parts, all substantially as and for the purpose herein set forth.

JAMES A. WHITNEY.

Witnesses:
CHAS. H. DOXAT,
H. F. PARKER.